INVENTOR.
FRANK W. LINDBLOM
BY
Barlow & Barlow
ATTORNEYS 3,010,107
CLIP-ON SUNGLASSES
Frank W. Lindblom, Warwick, R.I., assignor to Welsh Manufacturing Company, a corporation of Rhode Island
Filed Dec. 28, 1959, Ser. No. 862,298
3 Claims. (Cl. 2—13)

This invention relates to clip-on or auxiliary sunglasses which are designed as a supplemental unit for use with ordinary spectacles and more particularly to the method of fastening the supplemental unit to a frame front for sunglasses.

It is an object of the present invention to provide clip-on sunglasses which can be readily placed over ordinary spectacles without the use of any auxiliary attachment means.

Another object of the invention is to provide a pair of sunglasses which may be readily attached and detached from the spectacles with the use of only one hand.

A further object of the invention is to provide a simple attaching clip means for the frame of the auxiliary sunglasses which may be inexpensively manufactured and which will be extremely durable in use.

A still further object of the invention is to provide a novel clip means for the frame of the auxiliary sunglasses in which the spring means for the clip serves as the mounting means for the clip onto the spectacle frame front.

With these and other objects in view, the invention consists of certain novel features of construction as will be more fully described and particularly pointed out in the appended claims.

Figure 1:
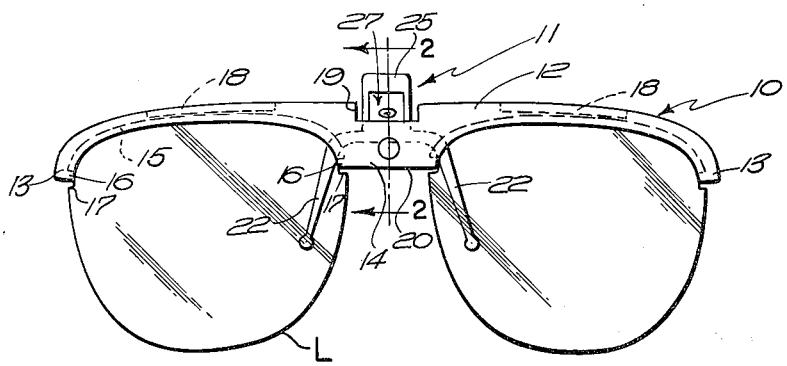
FIGURE 1 is a front elevational view of the auxiliary sunglasses made in accordance with the invention.

In proceeding with this invention, I first form a frame for reception of sunglass lenses and provide in the upper edge of the bridge portion a notch. I then suitably form a pair of tines with a handle member extending substantially at right angles therefrom and secure to the handle portion of the tines one end of a spring member, the other end of the spring member being fastened to the frame in a fashion whereby the handle portion of the tines will be received within the notch cut in the bridge portion.

Referring now particularly to the drawings, it will be seen that the sunglasses are composed of two members, namely a frame member generally designated 10 and a clip member generally designated 11. The frame member 10, which is illustrated purely by way of example and may take many specific forms, comprises a unitary upper frame structure 12 which is provided with end portions 13 and a bridge portion 14. The underside of the frame is provided with a suitable groove 15 which is adapted to receive the lens L that is secured therein by suitable means which may comprise a pair of projections at either end of the groove 15 as at 16 and a complemental notch in the lens L as at 17. The upper portion of the frame also has lips 18 extending rearwardly therefrom which lips are adapted to provide a seat permitting the frame to lie on the upper portion of the spectacles to which the auxiliary sunglasses are attached. The bridge portion 14 of the frame is characterized by a notch 19 opening from the upper edge thereof and a substantially flat lower edge 20 which provides a thumb piece to operate the clip when it is in assembled position.

Figure 2:
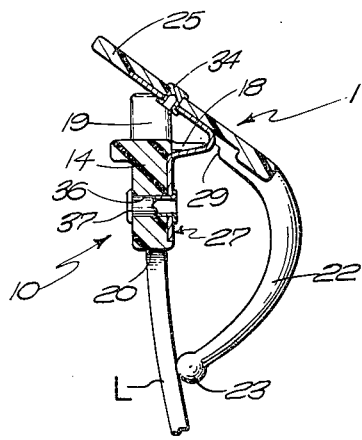
FIGURE 2 is a sectional view taken on lines 2—2 of FIGURE 1.
Figure 3:
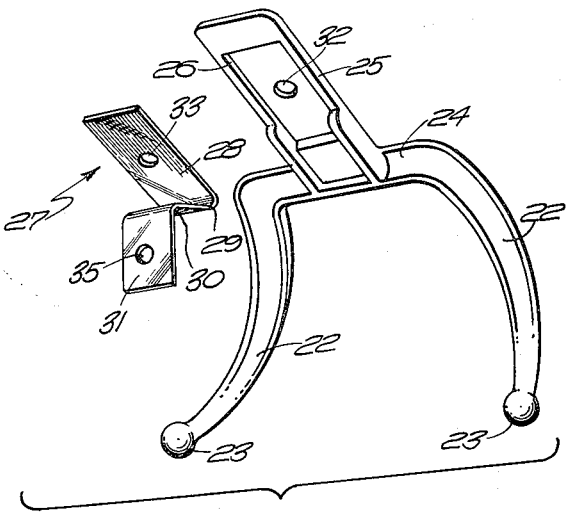
FIGURE 3 is a detached perspective view of the clip assembly.

The clip which is shown in FIGURES 2 and 3 is provided with a pair of tines 22 which are formed into somewhat of a wishbone shape. These tines or arms 22 have ball ends as at 23 which yield a spherical surface for contact with the lenses of the spectacles to which the auxiliary sunglass is attached. The tines or arms 22 are joined by a bridging structure 24 and leading from this bridging structure somewhat at right angles to the general extent of the tines 22 is a finger piece 25. The underside of the finger piece 25 is provided with a depression 26 for the reception of a portion of a spring support member 27. This spring support member is formed preferably from a flat strip of spring stock and has a first portion 28 that is adapted to be received in the depression 26. The spring support member 27 is reversely bent at one end of the portion 28 as at 29 and then oppositely bent as at 30 to provide a second portion 31 that is adapted to be attached to the reverse side of the auxiliary frame 10. Attachment of the spring support member 27 to the clip finger piece 25 may be effected by a variety of means such as an adhesive or by a rivet fastening. In the present instance a rivet fastening is illustrated and to this end an aperture 32 is formed in the arm 25 somewhat centrally of the depression 26 and a similar aperture 33 is provided in the portion 28 of the spring support member 27. A rivet such as 34 (see FIGURE 2) may then be passed through these two apertures to secure the spring support member 27 to the arm 25 of the clip. Similarly the portion 31 of the spring support member 27 may be provided with an aperture 35 and an aperture 36 may be formed through the bridge portion 14 of the auxiliary frame front, a rivet 37 passing through these two apertures and securing the entire clip 11 to the reverse side of the frame front 10. The recesses and spring portions fitting therein are rectangular providing a sufficiently snug fit so that rotation about either rivet is prevented.

It will be noted that the spring support member 27 when fastened to the reverse side of the frame front 10 serves as both a support for the clip 11 and as a spring member which urges the tines into engagement with the lenses of the primary spectacles to which the auxiliary sunglasses may be attached. Thus, when pressure is applied between the finger piece 25 and the surface 20 of the bridge portion 14, a hinge action will occur at the reverse bend 29 and the finger piece 25 will pass down into the notch 19. Alignment of the clip member relative to the auxiliary sunglass frame front is insured by the presence of the notch 19 which is slightly larger than the width of the finger piece 25. Thus, should any twisting action be present, this action will be prevented by the vertical walls of the recess 19 and insure alignment of the tines 22 relative to the auxiliary sunglass frame.

It will therefore be appreciated that there is shown herein a novel form of a clip for use with an auxiliary sunglass which will permit the auxiliary sunglasses to be readily attached and detached from spectacles and which because of the extreme simplicity of parts may be readily assembled.

I claim:

1. Clip-on sunglasses comprising a frame, a pair of lenses received in said frame, said frame having a bridge portion, said bridge portion having a notch formed therein opening from the upper edge thereof, a clip member, said clip member having a pair of tines and a finger piece extending therefrom substantially at right angles thereto and located above said notch, spring means comprising ribbon stock attached to said finger piece and extending therefrom with a reverse bend in generally an opposite direction and then in a right-angle bend to form a second portion, said second portion being attached to the rear surface of the frame at the bridge portion at a location where a portion of the finger piece is located above said notch whereby upon pressure being exerted on the finger piece the ends of the tines will move away from normal engagement with said lenses.

2. Clip-on sunglasses as in claim 1 wherein the finger piece has a recess in its under surface and said ribbon spring is of a size to fit in the recess in the finger piece and a single rivet attaches the two together.

3. Clip-on sunglasses as in claim 1 wherein a lip extends from said frame at the location of said recess and the reverse bend opposite direction portion of said spring extends along the under surface of lip and thence along the rear surface of the frame.

References Cited in the file of this patent

UNITED STATES PATENTS

| | | |
|---|---|---|
| 2,516,764 | Ehlert et al. | July 25, 1950 |
| 2,584,000 | Ehlert et al. | Jan. 29, 1952 |
| 2,691,165 | Kane | Oct. 12, 1954 |
| 2,572,598 | Abels | July 3, 1956 |
| 2,923,943 | Rubin | Feb. 9, 1960 |